No. 744,811. PATENTED NOV. 24, 1903.
E. G. SMITH.
SAW TOOL.
APPLICATION FILED JUNE 3, 1903.
NO MODEL.
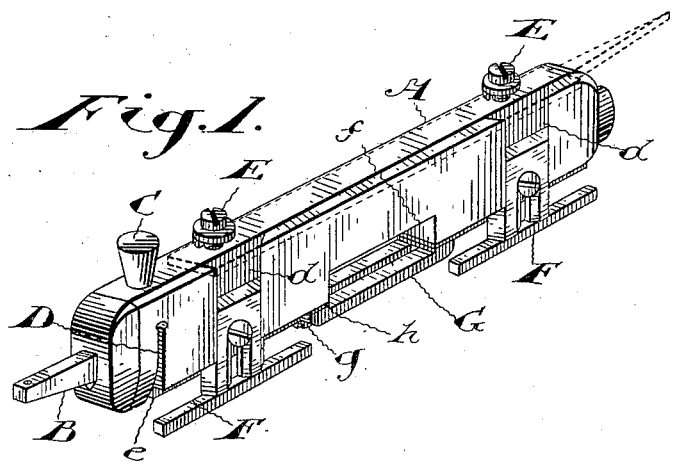
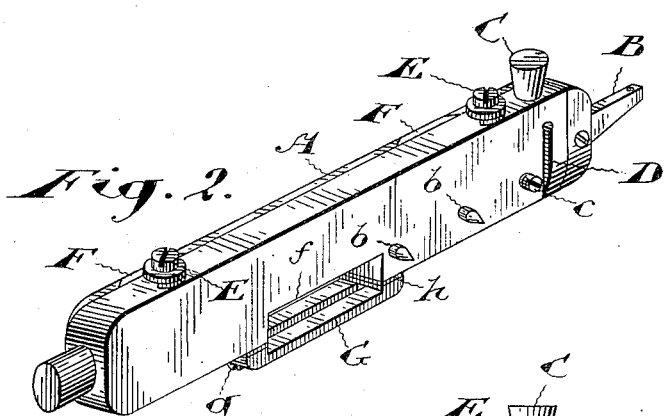
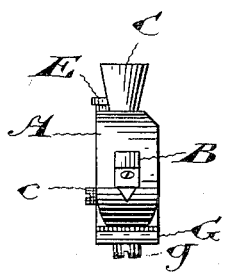
Witnesses
A. J. Colbourne
A. M. McRae
Inventor
Ernest G. Smith
by Ridout & Maybee
Attys No. 744,811. Patented November 24, 1903.

UNITED STATES PATENT OFFICE.

ERNEST GEORGE SMITH, OF LORIMER LAKE, CANADA.

SAW-TOOL.

SPECIFICATION forming part of Letters Patent No. 744,811, dated November 24, 1903.

Application filed June 3, 1903. Serial No. 159,971. (No model.)

*To all whom it may concern:*

Be it known that I, ERNEST GEORGE SMITH, of the post-office of Lorimer Lake, Parry Sound district, Province of Ontario, Canada, have invented certain new and useful Improvements in Saw-Tools, of which the following is a specification.

The object of my invention is to devise a simple compact tool by means of which all the operations necessary to put a saw into proper condition and to keep it so may be efficiently performed; and it consists, essentially, of a tool in which are combined a punch-set, a spring-set, a set-gage, a swaging-hammer, a jointer, and a cleaner-teeth gage, substantially as hereinafter more specifically described and then definitely claimed.

Figures 1 and 2 are perspective views of my improved saw-tool. Fig. 3 is an end view of the same from the punch-set end.

In the drawings like letters of reference indicate corresponding parts in the different figures.

The tool comprises an elongated substantially straight-sided body A, rectangular in cross-section. One end is provided with a projection B with a triangular-shaped recess at its base. This forms a punch-set, which being old and well known need not be more particularly described.

C is a swaging-hammer, by means of which the points of the drag or cleaner teeth of a saw may be swaged to make them better clean out the sawdust. Opposite the swaging-hammer a slot D is cut in the tool-body to form a spring-set. By engaging a tooth of the saw with this slot it may be readily bent to give it the desired set. In order to gage the proper amount of set, I provide the side of the tool with two fixed studs $b\ b$ and one adjustable screw-stud $c$, these being situated in line with one another. The stud $c$ is screwed in to give the desired set and the two studs $b\ b$ placed against the side of the saw with the stud $c$ in line with the point of the tooth. It is then easily seen whether the tooth has the desired set or not. The studs being adjacent to the spring-set slot D make them very convenient to use, and as they are in line with one another the set of the individual tooth is accurately gaged without reference to any bend or warp there may be in the length of the saw.

For jointing I provide the side of the tool with the screw-clamps E E, which may be screwed down to engage the side of a flat file, which will project over the side of the tool adjacent to the guides F F. These guides are T-shaped, as shown, and their stems are preferably dovetailed in cross-section and fitted into dovetailed grooves $d$ in the side of the tool in such a manner that the outer surfaces of the guides are substantially flush with the plane side of the tool. The heads of the guides also preferably fit into the recess $e$ in the edge of the tool when the guides are closed up. The saw is jointed by securing a file in place, as described, then extending the guides, as shown in Fig. 1, and placing the tool with their surfaces against the side of the saw and the file on the tops of the teeth. The file is then gently rubbed over the points of the teeth to bring them to an even length. The tool does not possess of itself sufficient width to enable it to contact with the plate of the saw below the teeth. Hence the use of the extensible guides insures the proper steadying of the saw when in use, while they enable the body of the tool to be made very compact for carrying in the pocket.

For the purpose of gaging the drag-teeth of the saw I form a recess $f$ in the edge of the tool adjacent to the heads of the guides F F. This recess is spanned by the bridge G, which has a slot cut therein to receive the points of the drag or cleaner teeth. The inner sides of the extensible guides F F are substantially in line with one edge of the slot in the bridge G. This bridge, while it may be formed integral with the tool, is preferably made separate, as indicated, and is secured in position by the set-screws $g$, as shown. This enables me to put liners $h$ between its ends and the tool, so that the bridge may be set out from the tool to varying distances, according to the amount it is desired to take off the points of the cleaner-teeth. The inner surface of the bridge, it will be noticed, is set out so as to extend somewhat below the under surface of the tool, which is preferably a plane surface.

The cleaner or drag teeth are gaged by introducing them through the slot in the bridge. The points of the cutting-teeth come in contact with the plane surface of the tool. A flat file is introduced into the recess $f$ and the points of the teeth cut off level with the inner surfaces of the bridge G.

What I claim as my invention is—

1. A saw-tool having a straight side; a recess formed in the said straight side; a longitudinally-slotted bridge spanning the said recess, its inner side being set slightly below the level of the said straight side of the tool, substantially as described.

2. A saw-tool having a straight side; a recess formed in the said straight side; a longitudinally-slotted bridge spanning the said recess, its inner side being set slightly below the level of the said straight side of the tool; and extensible guides having their inner sides substantially in line with one edge of the slot, substantially as described.

3. A saw-tool having a straight side; a recess formed in the said straight side; a longitudinally-slotted bridge spanning the said recess and removably secured in place by screws, its inner side being set slightly below the level of the said straight side of the tool, substantially as described.

4. A saw-tool having a plane side; guides transversely movable in grooves in the tool and set flush with the plane side; and file-clamps on a side at right angles to the aforesaid plane side, substantially as described.

Lorimer Lake, Ontario, May 26, 1903.

ERNEST GEORGE SMITH.

In presence of—
 F. A. LAURIE,
 HENRY STOREY.